Sept. 26, 1961         E. WEICHEL         3,001,830
DEVICE FOR SPREADING MATERIAL AT THE DISCHARGE
END OF PNEUMATIC CONVEYOR TUBES
Filed Aug. 1, 1958                        3 Sheets-Sheet 1

3,001,830
DEVICE FOR SPREADING MATERIAL AT THE DISCHARGE END OF PNEUMATIC CONVEYOR TUBES

Ernst Weichel, Bahnhofstr. 1, Heiningen near Goeppingen, Germany
Filed Aug. 1, 1958, Ser. No. 752,609
Claims priority, application Germany Aug. 1, 1957
5 Claims. (Cl. 302—61)

The invention relates to a terminal spreading device for pneumatic conveyor pipes.

In conveying loose materials (such as hay, straw, chaff, green fodder, grain, saw dust and the like) by means of blowers, chaff cutters or similar machines, the material has hitherto been blown out at a single point of the storage space, where it accumulates in a conical pile. The spreading of the material over the entire area of the storage space is effected by strenuous manual labor or by frequent and time-consuming readjustment of the conveyor pipe. Since, however, the depositing of the material in conical piles demixes the material in that the heavy and/or moist components are deposited in the center and the light and/or dry components at the periphery, uniform distribution cannot be achieved even by subsequent levelling of the pile. This circumstance is especially disadvantageous, if the material is subsequently subjected to a drying or fermentation process.

Motor-driven spreading devices which are intended to distribute the material after discharge from the conveyor pipe by means of rotating disks and the like are already known. Such devices entail high construction costs, and in the case of materials of low specific gravity (e.g. hay, straw and the like) the distribution distance is short because air resistance cannot be overcome by mechanical ejection means.

According to an object of the invention there is provided a simple spreader for any pipe diameter which will operate in any position and also achieve a uniform distribution, even of materials having a low specific gravity, over as large an area as possible. It is easily attachable, requires no supplementary drive, and permits simple adjustment to local conditions and the varying properties of different materials.

In accordance with the invention this object is arrived at by mounting at the discharge end of the conveyor a spreader in the form of an elbow adjustably combined with a device to completely or partially deflect the air stream and the material, the whole structure pivoting about an axis in alignment with the axis of the conveyor pipe and being so constructed that the spreading attachment is continuously kept in motion by reaction to the laterally deflected air stream.

Some examples of the invention are next described with reference to the annexed drawings in which:

FIG. 2 shows a further possible design of the spreader in accordance with the invention in which the spreader is mounted by means of a bearing attached to the discharge end of the pipe so that the frame used in FIG. 1 may be dispensed with.

Figure 1A:
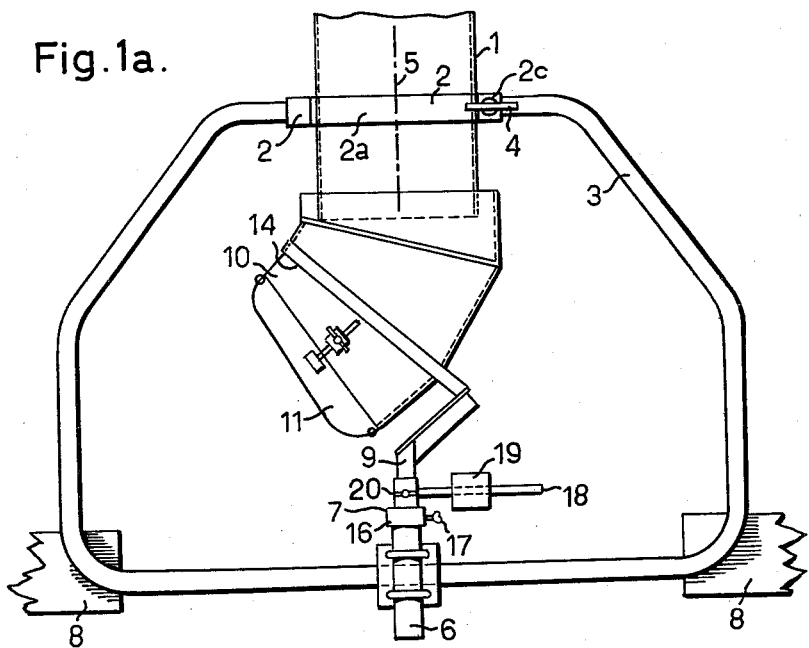
FIGS. 1a and 1b show one possible design of the spreader in which the spreader is mounted, by means of a frame equipped with a pipe-clip, so that it pivots about the continuation of the pipe axis.
Figure 1B:
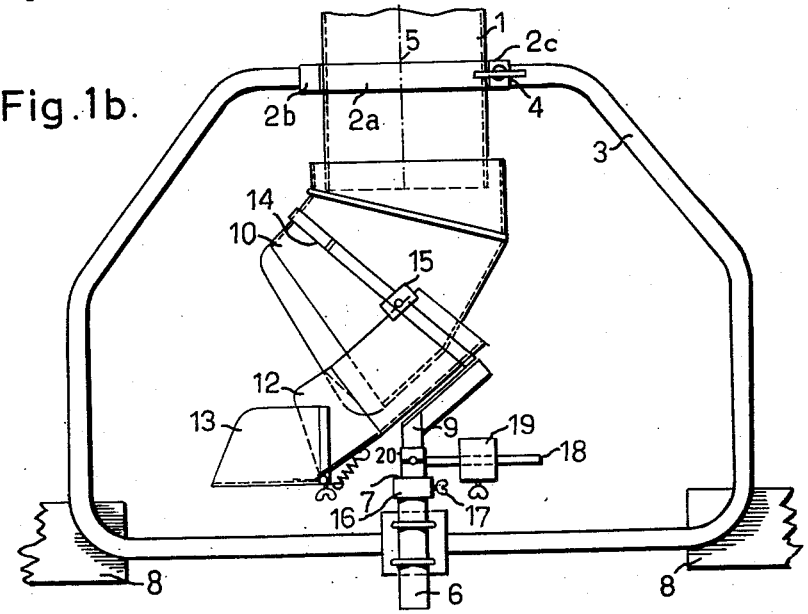

In the form of the invention shown in FIGS. 1a and 1b, a frame 3 is mounted at the end of the conveyor pipe 1 by means of a pipe-clip 2. The pipe-clip 2 can be mounted without tools, since the one half 2a can hinge back about the joint 2b, and the free end 2c is provided with a slot into which the tilting knurled screw 4 can be laterally inserted and then tightened. On the frame 3 and aligned with the pipe axis 5, a bearing 6 is attached, in which a shaft 7 is so mounted that it rotates easily. The bearing 6—appropriately positioned relative to the pipe axis 5—may also be firmly attached, either in addition to the connection to the frame 3 or exclusively, to the strutting 8 of the associated building, silo or the like. By means of a sleeve 9 the interchangeable spreader 10 is placed on the shaft 7; the spreader 10 consisting, for instance, of a trough-shaped section of any desired shape and curvature, or of a tube-bend of any desired curvature and length. Rotation is imparted to the form illustrated in FIG. 1a by the adjustable and removable air flap 11 and the spreader then ejects the material at a small angle relative to the pipe axis 5. By this means, the throwing distance is kept small and the material is blown directly on to the storage area, this giving the compact storage desirable in silos.

The form illustrated in FIG. 1b is set for as long a throw as possible, the material being ejected at right angles to the pipe axis and then falling freely so that the layers lie loosely one over the other. This is achieved by providing the spreader 10 with a trough-shaped slide 12, which can be adjusted relative to and locked in any desired position within the yoke 14, and which imparts a greater deflection to the material ejected from the spreader 10. The continuously variable adjustment of the ejection angle is rendered possible by the fact that the two clamps 15 hold the slide 12, which can be displaced longitudinally and laterally to any desired degree, firmly in any position, and that the slide 12 is additionally equipped with a pivoting and lockable deflection flap 13. If the slide 12 is displaced more to one side, only a certain proportion of the material will be thrown out, while at the same time part of the material will be deposited in the center of the storage area. In this case the slide 12 simultaneously acts as a means for deflecting the air laterally and as a continuous drive of the spreader 10. The direction and speed of rotation can therefore be steplessly regulated in a simple manner by displacing the longitudinal center line of the slide to a greater or smaller degree with reference to the pipe axis 5. An adjusting ring 16 that is rigidly mounted on the shaft 7 seals the bearing 6 and also bears a wing nut 17 by means of which the spreader 10 can be locked in any position. The counterweight 19, which can be moved along a rod 18, can be turned about the sleeve 9 and locked in position by the ring 20 so that the spreader can be accurately balanced in any position and for all slide settings. This is particularly necessary when the shaft 7 is in a horizontal operating position.

Figure 2:
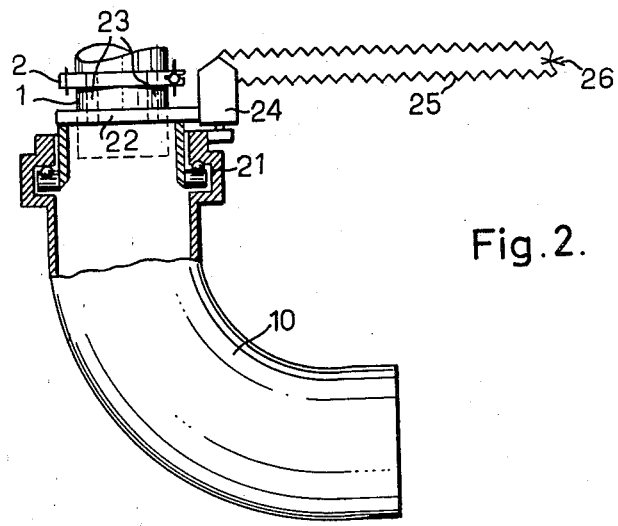

FIGURE 2 shows a possible form of the invention without the frame 3 and the bearing 6, in which the spreader 10 is mounted at the end of the conveyor pipe 1 in a conventional bearing 21 in such manner that the spreader rotates freely. Simple and rapid attachment and detachment is made possible by the fact that the bearing 21 is connected with a ring 22 which bears on a number of struts 23 the hinged pipe-clip 2 described in the foregoing. The current generator shown in FIG. 2 can be used for all forms of the invention. It is driven by the rotating spreader 10 and supplies electric current via a lead 25, which may have any desired length, to a pilot lamp 26, which may be placed in any desired position and permanently indicates whether the spreader is rotating.

Figure 3:
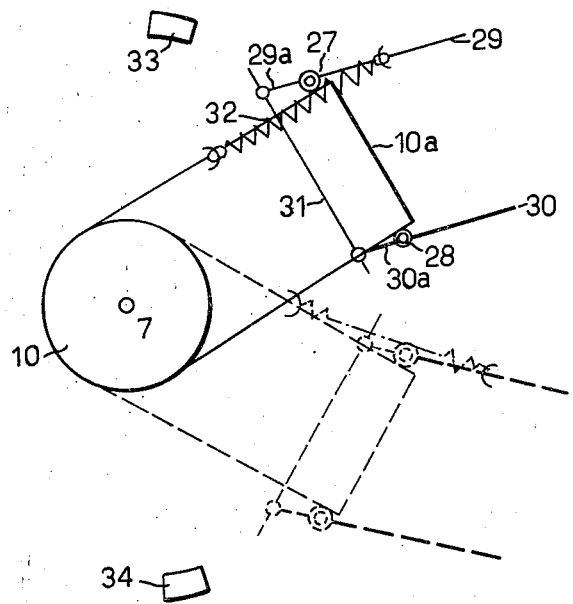
FIG. 3 shows a further possible design of the spreader in accordance with the invention in which the spreader can not only rotate continuously, but can also swing to and fro through any desired angle.

FIGURE 3 represents a further possible design of the spreader 10, which can not only rotate continuously, but can also swing to and fro through any desired angle. At the sides of the mouth 10a of the spreader are two pivoting flaps 29, 30 hinged about the axes 27 and 28, respectively, and the flap ends 29a, 30a, which protrude slightly towards the rear, are movably linked together by a connecting member 31 in the manner of a parallelogram linkage. They are always held firmly in the given position by the adjustable tension spring 32. The pivoting flaps 29, 30 deflect the air stream laterally so that the spreader rotates in the opposite direction about the shaft 7 until the end of the connecting member 31 strikes the adjustable stop 33. Due to the inertia of the spreader 10, the interconnected pivoting flaps 29, 30 are swung about the axes 27, 28. The line of traction of the spring 32 is transferred to the other side of the axes 27, so that the pivoting flaps 29, 30 are held in the new position until the spreader 10, in the course of the ensuing swing in the opposite direction, strikes the stop 34, thus effecting the next reversal. If the flaps 29, 30 are locked in position relative to the spreader by means of a device not shown in the drawing, and the stops 33, 34 are removed, continuous rotation can also be achieved.

Figure 4:
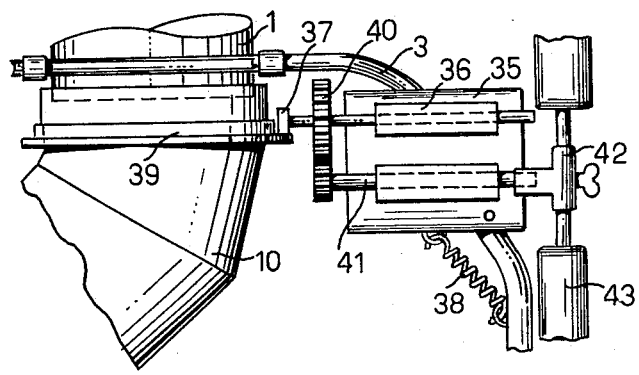
FIG. 4 shows a dynamic brake attachment for achieving very low rotary speeds, which can be used on all forms of the invention.

FIGURE 4 depicts a dynamic brake attachment which can be used in addition to achieve very slow speeds of rotation of the spreader 10. In some cases it is desirable to achieve as slow a rotation of the spreader as possible because this results in a longer throw and the avoidance of undesired centrifugal forces which detrimentally affect the material. On the conveyor pipe 1 or the frame 3 a simple gear mechanism 35 is so mounted that the friction wheel 37 on the dirve shaft 36 exerts a constant specific pressure via the adjustable spring 38 on the spreader 10, or on a roller path 39 seated on the spreader. By this means said friction wheel is driven by the rotating spreader. On the free end of the drive shaft 36, or, if desired, on a brake shaft 41 driven by the driven shaft via a pair of gears or friction rollers at a higher speed, is a vane 43 which pivots and is lockable in the sleeve 42 and which rotates with the shaft 36 or 41. By means of the air resistance, which can be adjusted by pivoting the fins of the vane 43, the drive shaft 36 and hence the spreader 10 can be slowed down. The braking effect increases with the speed of rotation and diminishes as the speed drops, so that the speed attained with a given vane adjustment remains substantially constant, and an undesirable stoppage of the spreader is also excluded.

Figure 5:
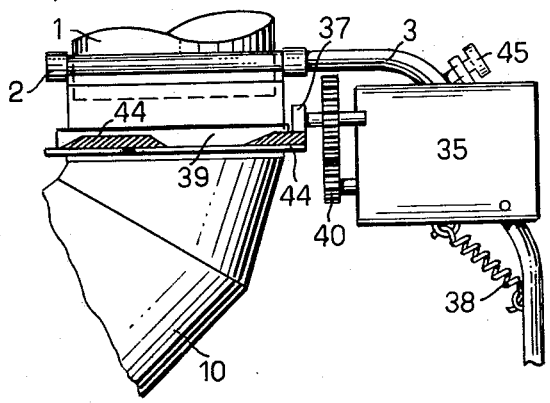
FIG. 5 shows a device for the periodic disengagement of the dynamic brake by means of an adjustable cam mechanism.

FIGURE 5 shows a device for the periodic interruption of the braking effect so that the speed of the spreader 10 can be varied a number of times at will within one revolution. This is of special importance, for instance, when rectangular storage areas are to be filled, since a slower speed is required at the corners than along the sides. Cam members 44 of any desired length can be attached in any position to the roller path 39. By means of a stop 45 it is insured that the frictional wheel 37 establishes friction contact with the roller path only via the cam members 44. The spreader 10 will therefore be slowed down only as long as a cam member is in contact with the friction wheel, and will travel over the intermediate distances without being braked, that is, at a higher speed.

Figure 6:
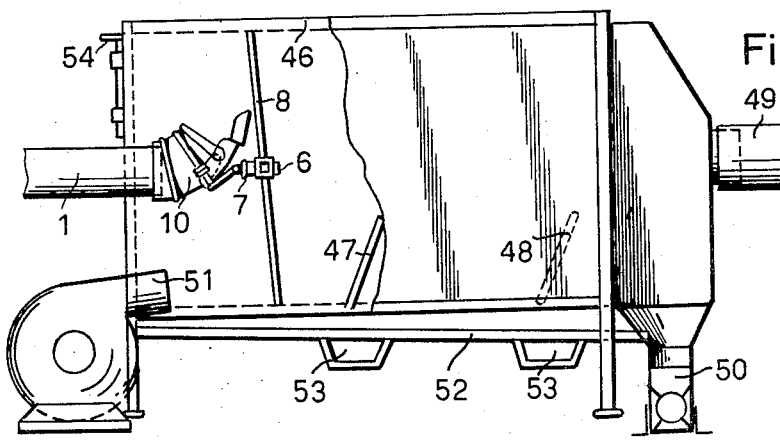
FIG. 6 shows a possible application of the spreader in conjunction with a sorting channel, which renders possible the separation of material according to air resistance and specific gravity.

FIGURE 6 shows a possible application of the spreader 10 in conjunction with a sorting channel 46, which may have a round, square, or any other desired cross-section. Its dimensions may be selected at will, and the longitudinal axis may be horizontal, inclined or even vertical. Similarly, the free cross-section of the sorting channel may be tapered in either direction. The conveyor pipe 1 and the spreader 10 are built into the sorting channel 46 in such a manner that the angle included between the longitudinal axis of the shaft 7 and the longitudinal axis of the sorting channel 46 can be varied at will. The spreader 10 feeds into the sorting channel a mixture of various sorts of material, for example chopped straw with cereal grains or chopped hay with foreign bodies and the like. Since the spreader 10 ejects the material into the sorting channel 46 in constantly changing directions, it will be so well and uniformly distributed therein that practically every particle is separated from adjacent particles. Since the sorting channel 46 has a cross-section which is a multiple of that of the conveyor tube 1, the velocity of the air stream is greatly reduced. Those components of the mixture which have the greatest specific gravity immediately fall down between the guide plates 47 and 48. The lightest components remain in the air stream and can be drawn off through the suction tube 49. Components which are not so light pass to the conveyor blower 50 and can either be led off by the latter or fed back into the conveyor tube 1 for resorting. The cleaning effect of the sorting channel 46 can be improved by conventional means such as supplementary air streams 51, screens or magnets 52. It is likewise possible to lead off each sort of material that is screened out into laterally located or deeper lying containers or conveyor mechanism 53, so that fully automatic operation of the sorting channel can be attained with a minimum of moving parts. The front end 46a of the sorting channel 46 may be either completely closed off, or entirely partially opened by sliding doors or flaps 54 in order to permit the entry of the desired amount of the surrounding air.

The arrangement illustrated in FIG. 6 makes it possible to clean the material of foreign bodies and to separate it into its various components, and can therefore entirely or partially replace conventional agricultural threshing or cleaning machines. If the sorting channel 46 is used in conjunction with a conventional threshing or cleaning machine, at least a preliminary separation is achieved, which permits part of the material to be extracted before it is fed into the conventional threshing or cleaning machine, in consequence of which the capacity of such conventional machines can be increased to a multiple of the former values.

The spreading attachment according to the invention can also be used for the spreading or distribution of substances or air from mobile work machines, and also for spreading fodder at feeding points, for spreading litter, and the like. The invention renders considerable savings in manual labor and/or operating personnel possible and hence constitutes a substantial advance.

The invention is not restricted to the possible forms herein represented and described.

What I claim is:

1. In combination with a pneumatic conveyor pipe operating with a pneumatic medium; a spreader comprising an elbow shaped pipe adjustably and rotatably connected to said conveyor pipe and adapted to deflect the pneumatic medium and be rotated thereby, means engaging said elbow shaped pipe and being rotated thereby, and adjustable speed control means coupled to and driven by the first said means, said speed control means providing an adjustable resistance to being driven by the first said means and thereby to the rotation of the latter by said elbow shaped pipe in order to control the rotation of the elbow shaped pipe.

2. A spreader as claimed in claim 1 wherein said speed control means comprises adjustable vanes.

3. A spreader as claimed in claim 2 comprising resilient means yieldably urging the first said means into engagement with said elbow shaped pipe.

4. A spreader as claimed in claim 3 wherein said elbow shaped pipe and first said means comprise respective friction drive elements operatively engaged to drive the first said means.

5. A spreader as claimed in claim 4 wherein said friction drive elements are adapted to be disengaged at predetermined intervals during each revolution of said elbow shaped pipe.

References Cited in the file of this patent

UNITED STATES PATENTS

| | | |
|---|---|---|
| 963,583 | Kennel | July 5, 1910 |
| 1,420,593 | Titchmarsh | June 20, 1922 |
| 1,786,677 | Sievert | Dec. 30, 1930 |
| 1,787,261 | Reinke | Dec. 30, 1930 |
| 2,010,312 | McIntire | Aug. 6, 1935 |
| 2,040,506 | Teisberg | May 12, 1936 |
| 2,449,592 | Daddario | Sept. 21, 1948 |
| 2,780,498 | Zygmontowski | Feb. 5, 1957 |